3,183,389
DETECTOR FOR RADIOACTIVE HYDROGEN GAS
Ralph C. Maggio, 2175 Hudson Terrace, Fort Lee, N.J., and Charles Christianson, New York, N.Y. (1192 Walton Ave., Bronx, N.Y.)
Filed Dec. 27, 1960, Ser. No. 78,789
6 Claims. (Cl. 313—93)
(Granted under Title 35, U.S. Code (1952), sec. 266)

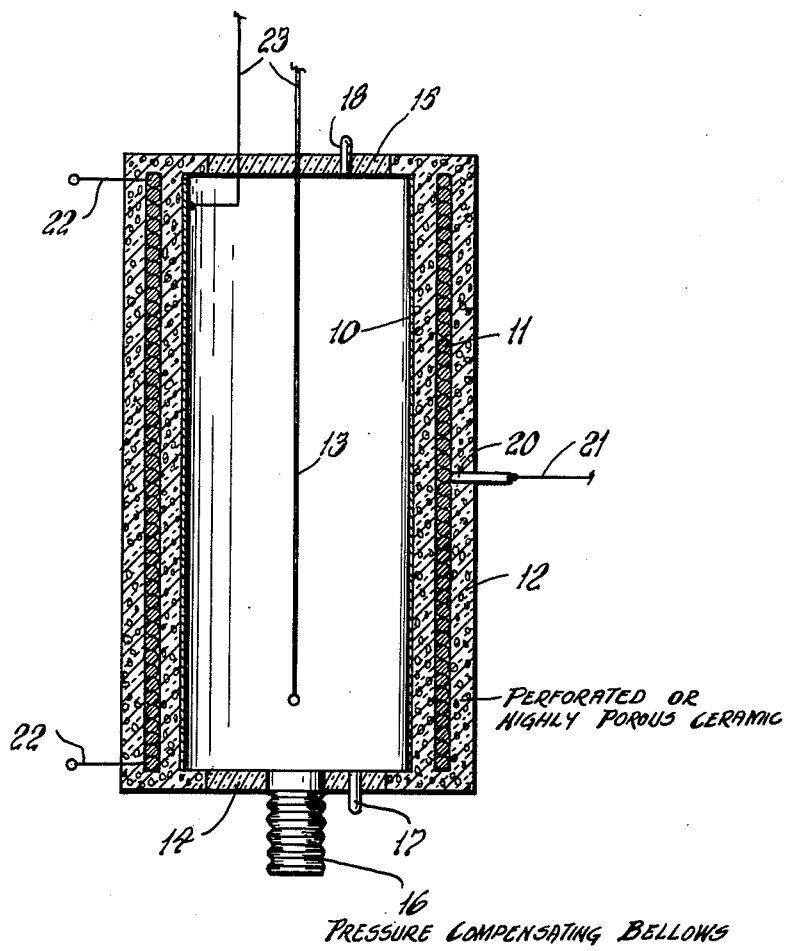

The invention described herein may be manufactured and used by or for the Government of the United States of America for governmental purposes without the payment of any royalties thereon or therefor.

This invention relates to detecting and measuring the quantity of uncombined radioactive hydrogen in other gases.

In a manufacturing or storage facility or in a laboratory where radioactive isotopes of hydrogen may be available in quantity, traces of these gases may accidentally leak into the local atmosphere. The presence of these radioactive gases in the local atmosphere constitutes a serious health hazard.

Attempts have been made to detect radioactive hydrogen in a local atmosphere where there was reason to suspect its presence. One method was to utilize an ionization chamber having a cylindrical shell electrode and a central coaxial electrode, the combination being open to the atmosphere at one end and having an electric field between the electrodes. A resistor is connected in series with the direct current source producing the electric field between the electrodes whereby when direct or impulse current flows between the electrodes, a corresponding voltage is developed across the resistor. Sensitive direct current amplifier circuitry is coupled to the resistor for measuring the current flow between the electrodes. The level of current flow between electrodes is minute and the circuitry for measuring the current is complex and expensive. While the presence of radioactive hydrogen in the atmosphere can cause some ionization of the air in the ionization chamber and thus cause current flow along the electric field between the electrodes, the presence of other radioactive substances can also produce the same effect. In fact, the presence of materials in the atmosphere that lowers the electrical resistance between the electrodes, namely moisture and aerosols, also produces the same effect. Therefore, this method is unsatisfactory because it does not detect radioactive hydrogen in the presence of other contaminants, because it requires complex electronic circuitry to sense minute direct current levels, and because it is sensitive to ambient temperature, humidity, pressure and aerosols or smoke in the atmosphere.

A scintillation technique also has been used to detect radioactive hydrogen in the atmosphere. A thin layer of a scintillation material, e.g., a phosphor, is mounted in a region where it is likely to intercept or be affected by the presence of radioactive hydrogen in the atmosphere. Electrons are dislodged from the scintillation material by the radioactive particles thereby producing minute pulses of light. A photomultiplier tube senses the light pulses. Sensitive amplifier circuitry is connected to the photomultiplier. However, these techniques do not respond selectively to radioactive hydrogen, require expensive complex photomultipliers and circuitry to sense the minute pulses of light. Also, it is difficult and expensive to prepare the thin layers of scintillation material.

An object of this invention is to detect and measure uncombined radioactive hydrogen gas in other gases or in local atmosphere.

A further object is to detect and measure uncombined radioactive hydrogen gas in the presence of other radioactive gases and particulate radioactive matter.

A further object is to detect and measure uncombined radioactive hydrogen gas relatively simply, practically, efficiently, accurately, inexpensively, and independently of ambient temperature, barometric pressure, humidity and contaminants in the atmosphere.

Other objects and many of the attendant advantages of this invention will be readily appreciated as the same becomes better understood by reference to the following detailed description when considered in connection with the accompanying drawing wherein:

The single figure is a cross section view of an embodiment of this invention.

Uncombined hydrogen gas can diffuse through a thin continuous layer of some metals at elevated temperatures. Among these metals are nickel, palladium, or iron, substantially free of impurities and in a layer approximately one to five mils thick. While this action is more efficient at elevated temperatures, the effectiveness of palladium deteriorates at about 300° C. and above and therefore should be used substantially below that temperature. While other gases might diffuse through the thin layer too, the ratio of hydrogen to other gases diffusing through such thin layer at elevated temperature has been found to be very high.

The illustrated embodiment includes a thin metal layer 10 with a uniform wall thickness of approximately one to five mils and being of a metal through which hydrogen diffuses much more readily than do other gases. The layer 10 is imperforate and continuous. Cements or metal solder may be used to form a seam where it closes upon itself as a cylinder. Heater wire 11, e.g., Nichrome, is distributed around the outside of the cylindrical metal layer 10 and is embedded in unglazed porous or perforated ceramic 12. The particular ceramic chosen is not critical. The inner surface of the ceramic cylinder 12 is contiguous with the outer surface of cylindrical layer 10 and is in substantially continuous face-to-face contact therewith and is coextensive therewith and preferably the surfaces are bonded together. Unglazed ceramic will readily permit gases to diffuse therethrough. The ceramic serves two functions, namely, as a support to afford rigidity to the cylindrical layer 10 and to transfer heat from the heater wire 12 to the cylindrical layer 10 at substantially uniform temperature throughout. The ceramic may be formed as an inner and outer layer with the wire therebetween. A slender rod-shaped electrode 13 is supported coaxially within the cylinder by one or both of the end walls 14 and 15. The end walls are of insulating material, such as glazed ceramic to prevent diffusion of gases therethrough. The end walls 14 and 15 are recessed into the ends of cylindrical layer 10 and are sealed to the inner surface of the ends of layer 10. A pressure compensating bellows-like element 16 is secured in one of the end walls 14 and 15 for pressure equalization. Glass stems 17 and 18 are sealed into each of the end walls for use in charging the unit with counting gas at approximately atmospheric pressure. The counting gas includes approximately 99% ionization gas and 1% quenching gas. Examples of such gases are argon 99% and methane 1%, helium 99% and isobutane 1%. A gas charging source is connected to one of the stems 17, 18 and charging gas is passed through the unit to flush out the atmosphere therein. Then the stems 17 and 18 are sealed by inductive heating while the counting gas included in the unit is at pressure corresponding to substantially atmospheric pressure at the selected operating temperature. The bellows-like element 16 operates to maintain the pressure approximately constant over a selected temperature range.

A thermostat 20 is mounted on the unit for temperature control. Electrical leads 21, 22, 23 are brought out from thermostat 20, the heater wire 12, and from the electrodes 10 and 13. The thermostat may be connected in series with the heater wire and a heater power supply, not shown.

In operation, the unit is supported in a suspect atmospheric environment. The unit is operated at a temperature at which it was previously calibrated in chambers containing known concentrations of radioactive hydrogen gas. The temperature of operation is lower for palladium (below 300° C.) than for nickel. Nickel may be operated at substantially higher temperature. The selected temperature is maintained automatically by the thermostat. Quantitative measurement is made with circuitry that is of the type utilized in Geiger-Müller counters; this device operates in a manner similar to other Geiger-Müller type counters.

At the elevated temperature, any radioactive hydrogen present in the air will pass through the openings in the ceramic and upon reaching the hot cylindrical layer 10 (generally the cathode), the hydrogen will diffuse through layer 10 and enter the sensitive volume of the device. If the device is connected to conventional nuclear counting equipment, the radioactive hydrogen will produce pulses and be counted. The device is operated in the Geiger or proportional region. The radioactive hydrogen passed into the device will be counted with approximately 100% efficiency and will indicate the concentration of radioactive hydrogen in the surrounding atmosphere.

The device may be provided with a four prong conventional base, not shown. Two of the prongs may be connected in series with the heating wire and thermostat. The electrodes would be connected to the other two prongs.

This instrument is insensitive to ambient temperature, pressure, humidity, other radioactive gases and other radioactive particulate matter. The device is simple in construction and has particular utility for remotely monitoring radioactive areas for the presence of radioactive hydrogen in the presence of radioactive gas or contaminants. This device may be fabricated in sizes and shapes similar to existing Geiger-Müller counters.

Obviously many modifications and variations of the present invention are possible in the light of the above teachings. It is therefore to be understood that within the scope of the appended claims the invention may be practiced otherwise than as specifically described.

We claim:
1. A device for use in detecting the presence of traces of uncombined radioactive hydrogen in other gases and for making measurements comprising a closed container wherein at least a portion of the container wall is relatively permeable to diffusion therethrough of uncombined radioactive hydrogen and is comparatively impermeable to other gases, said portion of said container wall being of unglazed porous ceramic and lined on the inside with a thin continuous imperforate layer of metal that is relatively permeable to diffusion therethrough of ucombined radioactive hydrogen, and is comparatively impermeable to other gases, electrode means in said container for use in establishing an electric field in said container, and a counting gas confined by the container wall in said container under substantially ambient pressure, whereby when a unidirectional electric field is established in said container and radioactive hydrogen outside said container diffuses through said container wall into the interior of said container, pulses of current flow occur along the electric field due to ionization pulses caused by the diffused radioactive hydrogen.

2. A device as defined in claim 1, wherein said portion of said container wall permeable to uncombined radioactive hydrogen is a major part of the container wall.

3. A device as defined in claim 2, wherein said container is cylindrical with an end wall sealed to each end thereof and wherein the entire cylindrical wall is permeable to uncombined radioactive hydrogen and the inner surface of said cylindrical wall is electrically conductive and wherein said electrode means includes a thin rod disposed axially in said container and extending approximately end-to-end of said cylinder.

4. A device as defined in claim 3, wherein said cylindrical wall is substantially more permeable to uncombined radioactive hydrogen at elevated temperature, and means for heating said cylindrical wall.

5. A device for use in detecting the presence of uncombined radioactive hydrogen in other gases and in the presence of other radioactive gases and for making measurements of the radioactive hydrogen comprising a hollow cylinder of unglazed ceramic that is permeable to diffusion of gases through the wall thereof, electrical heating wire distributed through said ceramic cylinder, a thin continuous imperforate layer of metal approximately one to five mils thick overlaying the entire inner surface of said ceramic cylinder in intimate face-to-face contact, said layer of metal being of the type that is relatively permeable to diffusion therethrough of uncombined radioactive hydrogen when said layer of metal is at elevated temperature and comparatively impermeable to other gases, gas impermeable end walls sealing the cylinder ends and together therewith forming a closed container, an electrode supported centrally in said cylinder, and a counting gas confined by and occupying the interior of said container whereby when a unidirectional field is established between said electrode and said thin layer of metal overlaying the inner surface of said ceramic cylinder and said heating wire is energized to raise the ceramic cylinder to a selected temperature, radioactive hydrogen that may be present in the surrounding atmosphere will diffuse into said container and cause ionization pulses in said counting gas which are a measure of the quantity of radioactive hydrogen in the surrounding atmosphere.

6. A device for use in detecting the presence of uncombined radioactive hydrogen in other gases comprising a closed container wherein at least a portion of the container wall is of unglazed ceramic that is permeable to diffusion of gases therethrough and supporting thereacross a thin continuous imperforate layer of metal of the type that is relatively permeable to diffusion therethrough of uncombined radioactive hydrogen when said layer of metal is at elevated temperature, means carried by said unglazed ceramic for elevating the temperature of the layer of metal, means in said container for establishing an electric field in the container, and a counting gas confined in said container whereby when a unidirectional electric field is established in said container and radioactive hydrogen outside said container diffuses through said container wall into the interior of said container, pulses of current flow occur along the electric field due to ionization pulses caused by the diffused radioactive hydrogen.

References Cited by the Examiner

UNITED STATES PATENTS

| | | | |
|---|---|---|---|
| 2,409,498 | 10/46 | Keston | 313—93 X |
| 2,489,436 | 11/49 | Salisbury | 250—84.5 |
| 2,586,291 | 2/52 | Bender | 313—339 X |
| 2,596,080 | 5/52 | Raper et al. | 313—93 |
| 2,735,019 | 2/56 | Dewan et al. | 250—84.5 |
| 2,917,648 | 12/59 | Davidon | 313—93 |
| 3,091,718 | 5/63 | Shurgan | 313—221 X |

GEORGE N. WESTBY, *Primary Examiner.*

RALPH G. NILSON, *Examiner.*